United States Patent [19]

Markert et al.

[11] Patent Number: 4,631,306
[45] Date of Patent: Dec. 23, 1986

[54] METHOD FOR THE MANUFACTURE OF MOLDED MATERIALS

[75] Inventors: Helmut Markert; Klaus-Robert Hauschildt, both of Nuremberg; Wolfgang Rogler; Klaus Kretzschmar, both of Erlangen, all of Fed. Rep. of Germany

[73] Assignee: Siemens Aktiengesellschaft, Berlin and Munich, Fed. Rep. of Germany

[21] Appl. No.: 822,913

[22] Filed: Jan. 22, 1986

Related U.S. Application Data

[63] Continuation of Ser. No. 624,984, Jun. 27, 1984, abandoned.

[30] Foreign Application Priority Data

Jun. 27, 1983 [DE] Fed. Rep. of Germany ....... 3323084

[51] Int. Cl.$^4$ ........................ C08L 63/00; C08K 3/34; C08K 3/26; C08K 3/22
[52] U.S. Cl. .................................. 523/457; 523/466; 525/528; 528/53
[58] Field of Search ................ 525/528; 523/457, 466; 528/53

[56] References Cited

U.S. PATENT DOCUMENTS

| | | | |
|---|---|---|---|
| 3,494,888 | 2/1970 | McElroy | 528/44 |
| 4,070,416 | 1/1978 | Narahara et al. | 525/528 |
| 4,129,554 | 12/1978 | Karasawa et al. | 528/53 |
| 4,143,009 | 3/1979 | Dewey | 525/528 |

*Primary Examiner*—Lewis T. Jacobs
*Attorney, Agent, or Firm*—Kenyon & Kenyon

[57] ABSTRACT

This invention relates to a method for the manufacture of molded material for an insulating component made of a quick-hardening reaction resin which employs a hardening catalyst. An object of the invention is to provide reaction resins which allow the manufacture of molded materials with increased dimensional heat resistance and at the same time, good mechanical properties. According to the invention, a reaction resin mixture of a polyepoxide and a polyisocyanate (EP/IC resin) with a formula mole ratio EP:IC of about 1 to 5 and a viscosity of up to about 7000 mPa·sec (at 25° C.) is cross-linked under pressure by means of a tertiary amine or imidazole hardening catalyst at a gelling temperature of about 130° to 150° C. and is post-hardened at a temperature of 150° to 200° C. This produces a reaction resin molded material (OX/ICR molding material) containing oxazolidinone and isocyanurate rings with a mole ratio OX:ICR greater than 1 and, after hardening, the reaction of the epoxy and isocyanate groups of the EP/IC resin, is above about 90%.

13 Claims, No Drawings

METHOD FOR THE MANUFACTURE OF MOLDED MATERIALS

This application is a continuation of application Ser. No. 624,984, filed June 27, 1984, now abandoned.

The invention relates to a method for manufacturing molded materials for insulating components from fast-hardening reaction resins in the presence of a hardening catalyst.

BACKGROUND OF THE INVENTION

Economical application of reaction resin molded materials to the manufacture of insulating components, requires quick-hardening reaction resins that shorten mold occupancy times and thus production costs. In the electrical industry, acid-anhydride-hardenable epoxy resins are predominantly used for the manufacture of mechanically-thermally and electrically high-quality reaction resin molded materials. Processes analogous to injection molding of resins adjusted for high reactivity are known wherein the mold occupancy times can be reduced considerably from conventional casting procedures. In such processes low viscosity epoxy resin compounds usually containing fillers are forced into casting molds. The casting molds, as a rule, have a temperature substantially higher than the resin compound which gels faster at the higher temperatures than in conventional procedures, wherein heat is applied, usually in steps, only after the casting, to effect gelling and cross-linking of the epoxy resins.

A disadvantage of using acid-anhydride-hardenable epoxy resins in processes analogous to injection molding is a decline in the mechanical properties of the resulting injection-molded bodies in comparison to conventional castings, e.g., reduced bending strength. The reduced mechanical properties are apparent from available technical literature and have been documented by our own investigations summarized in Table 1 below.

high dimensional heat stability and at the same time, good mechanical properties can be made.

Known highly heat-resistant reaction resin materials may be prepared by thermal hardening of reaction resin mixtures of polyepoxides and polyiscoyanates, so-called EP/IC resins, in the presence of hardening catalysts (see DE-AS No. 1 115 922: column 5, lines 9 to 14, and DE-AS No. 1,963,900: column 1, lines 4 to 13 and 48 to 60). For the preparation, EP/IC resins are described in the literature (U.S. Pat. No. 4,070,416) which have a formula mole ratio of the epoxy and isocyanate groups (EP:IC) of less than 1. It is pointed out there that the best thermal molded-material properties of the molded materials containing oxazolidinone and isocyanurate rings (OX/ICR molded materials) are obtained if EP/IC resins with a EP:IC mole ratio of 0.2 to 0.7 are cross-linked in the temperature range between 70° and 130° C. and are post-hardened at temperatures of up to 220° C. The molded materials manufactured in this manner, exhibit excellent dimensional heat stability but have only moderate mechanical properties and insufficient temperature cycle resistance. The mechanical properties are known to deteriorate with increasing polyisocyanate content in the EP/IC resins.

It is therefore understandable that it has been suggested that the mechanical properties of OX/ICR molded materials may be improved by incorporating flexibilizing or elastifying components in the resins. Proposed suitable polyepoxide components for the EP/IC resins are pre-polymer oxazolidinones with terminal epoxy groups (U.S. Pat. No. 3,979,365). However, the viscosity of these polymers, is very high so that they are difficult to inject without using solvents. Another proposal is to add polyglycidyl esters of dimerized fatty acids to EP/IC resins with other polyepoxides (U.S. Pat. No. 4,100,118). While these polyglycidyl esters have a low viscosity, they exhibit a poor mixing behavior in the EP/IC resins. It has also been proposed to add copolymers of butadiene to the EP/IC resins for

TABLE 1

Molded Material Properties of Acid-Anhydride-Hardened Epoxy Resins as a Function of the Standard-Rod Fabrication Conditions

| Epoxy Resin Composition (Abbreviated Designation)[1] | | | Standard Rod Fabrication Conditions[2] | | Molded Material Properties[3] | | |
|---|---|---|---|---|---|---|---|
| | | | | | BF N/mm$^2$ | SZ Nmm/mm$^2$ | T$_M$ °C. |
| BAGE | 100 | MT[4] | KGT: | 1 h 100° C. | 124 | 13 | 115 |
| HHPSA | 80 | MT | | 3 h 130° C., 16 h 180° C. | | | |
| DMBA | 0,5 | MT | NSG (3 bar): | 10 min 150° C. | 116 | 11 | 117 |
| QM I | 360 | MT | | 16 h 180° C. | | | |
| HYEP | 100 | MT | KGT: | 1 h 100° C. | 133 | 12 | 127 |
| MTHPSA | 110 | MT | | 3 h 130° C., 16 h 180° C. | | | |
| IMI | 0,5 | MT | NSG (3 bar): | 10 min 150° C., | 121 | 10 | 133 |
| QM I | 380 | MT | | 16 h 180° C. | | | |

[1]For chemical designation see Table 10
[2]KGT: Conventional casting technique
NSG: Low-pressure fast-casting technique
[3]BF = bending strength
SZ = impact strength
T$_M$ = dimensional heat resistance according to Martens
[4]MT = mass parts Another disadvantage of anhydride-cross-linkable epoxy resins is that modifications increasing the dimensional heat resistance of the molded materials to temperatures above 150° C. usually cause losses in their mechanical properties. In contrast, the increasingly higher thermal stress requirements for reaction resin molded materials in the electrical industry calls for quick-hardening reaction resins from which molded materials with instance, copolymers with acrylonitrile as an elastifying component (U.S. Pat. Nos. 4,128,531 and 4,130,546). These copolymers have functional groups such as hydroxyl and carboxyl groups, and the carboxyl groups may be reacted with polyepoxides. These copolymers especially in the case of filler-containing EP/IC resins, cannot be used efficiently in injection molding processes, due to their high viscosity. In addition, such copolymers are difficult to process, since they exhibit a high tendency to separate from the EP/IC resin. It is a further disadvantage of using the EP/IC resins, known to date, in processes analogous to injection molding, that the resulting molded materials have mechanical properties inferior to those produced in conventional casting and hardening of these reaction resins as indicated by the data presented in Table 2 below.

TABLE 2

Influence of Standard-Rod Fabrication Conditions on the Molded Material Properties of Cross Linked EP/IC Resins (Formula mole ratio EP/IC <1)

| EP/IC Resin Components[1] | Mole Ratio EP:IC | Standard Rod Fabrication Conditions[2] | | Molding Material Properties | | |
|---|---|---|---|---|---|---|
| | | | | BF N/mm$^2$ | SZ Nmm/mm$^2$ | $T_M$ °C. |
| BAGE;MDI QM I (66%) | 0.5 | KGT: | 1 h 130° C. 3 h 130° C., 16 h 200° C. | 105 | 6 | 235 |
| BCl$_3$.DMBA(1.5%)[3] | 0.5 | NSG (3 bar): | 10 min 150° C., 16 h 200° C. | 76 | 4 | 209 |
| NOEP, PPGE[4]; MDI QM II (66%) | 0.37 | KGT: | 1 h 110° C. 4 h 140° C., 16 h 200° C. | 115 | 12 | 225 |
| BCl$_3$.DMBA(1,5%)[3] | 0.37 | NSG (2 bar): | 8 min 140° C., 16 h 200° C. | 96 | 8.3 | 216 |

[1] For chemical designation see Table 10
[2] KGT: Conventional casting technique, NSG: Low-pressure fast-casting technique
[3] Catalyst concentration referred to resin matrix
[4] Mole ratio NOEP:PPGE = 1.0

It is an object of the present invention to provide a low-viscosity reaction resin which can be filled to a high degree, that is easy to mix, hardens quickly and requires no solvents for use. Moreover, in comparison with acid anhydride-hardenable epoxy resins which have been used technically heretofore and were processed analogously to injection molding, the resins of this invention yield molded materials with substantially increased dimensional heat resistance and at the same time have good mechanical properties.

SUMMARY OF INVENTION

According to the present invention, the foregoing objects are achieved by the provision of reaction resin mixtures of polyepoxides and polyisocyanates (EP/IC resins) with a formula mole ratio of the epoxy to isocyanate groups (EP/IC) in the range of about 1:1 to 5:1 and a viscosity of up to about 7000 mPa.sec at 25° C., which are cross-linked by means of a tertiary amine or imidazole catalyst at gelling temperatures of 130° to 150° C. under pressure; and are post-hardened at temperatures of 150° to 200° C., in the course of which reaction resin molded materials (OX/ICR molded materials) containing oxazolidinone and isocyanurate rings with a mole ratio of the oxazolidinone and isocyanurate rings (OX/ICR) greater than 1 are formed and the reaction of the epoxy and isocyanate groups is above 90% after the hardening.

DETAILED DESCRIPTION OF THE INVENTION

The OX/ICR molded materials prepared in accordance with the present invention have improved mechanical properties over comparable known molded materials. The improvement of the mechanical properties may be explained by the higher content of oxazolidinone and polyoxazolidinone structures incorporated into the lattice of these materials; than would be in the case of EP/IC resins with formula mole ratios EP:IC smaller than 1. Isocyanurate structures cause a lattice with small meshes and a stiffening of the polymer chain, so that they primarily influence the glass transition temperature of the molded materials. In contrast thereto, the oxazolidinone structures are believed to widen the lattice and lead to greater mobility of the polymer chain. The mechanical-thermal properties of OX/ICR molded materials therefore appear to be determined primarily by the mole ratio of the oxazolidinone and isocyanurate structures built into the lattice. In the molded materials prepared in accordance with this invention, the mechanical properties may be further improved by the provision of a higher content of polyether structures, generated by epoxy polymerization, in the polymer lattice.

Investigations of our own have shown that, in the cross-linking of EP/IC resins with a formula mole ratio EP:IC of 0.2 to 0.7; the mole ratio OX:ICR of the OX and ICR rings formed in the OX/ICR molded material is distinctly below 1. The test results, given in Table 3 below, show that the mole ratio OX:ICR is usually in the range of 0.4 to 0.6.

TABLE 3

Formation of OX and ICR Rings in the Cross-linking of EP/IC Resins (Formula mole ratio EP:IC = 0.25 to 0.5)

| EP/IC Resin Components[1] | Mole Ratio EP:IC | Hardening in %[3] BCl$_3$DMBA | Catalyst[3] 1CE2PI | T-Base | Mole Ratio OX:ICR | Cross-linking Conditions |
|---|---|---|---|---|---|---|
| BAGE, MDI | 0.50 | 1.0 | — | — | 0.51 | 3 h 130° C.; 16 h 200° C. |
| | 0.50 | 2.0 | — | — | 0.60 | 3 h 130° C.; 16 h 200° C. |
| NOEP,PPGE[2] MDI | 0.37 | 1.5 | — | — | 0.46 | 3 h 110° C.; 4 h 140° C. 16 h 200° C. |
| | 0.37 | — | 1.0 | — | 0.54 | 3 h 110° C.; 4 h 140° C. 16 h 200° C. |
| BAGE; MDI | 0.25 | 2.0 | — | — | 0.46 | 5 h 130° C.; 16 h 200° C. |

TABLE 3-continued

Formation of OX and ICR Rings in the Cross-linking of EP/IC Resins (Formula mole ratio EP:IC = 0.25 to 0.5)

| EP/IC Resin Components[1] | Mole Ratio EP:IC | Hardening in %[3] BCl₃DMBA | Catalyst[3] 1CE2PI | T-Base | Mole Ratio OX:ICR | Cross-linking Conditions |
|---|---|---|---|---|---|---|
| | 0.25 | — | — | 2.5 | 0.45 | 5 h 130° C.; 16 h 200° C. |

[1]For chemical designation see Table 10
[2]Mole ratio NOEP:PPGE = 1.0
[3]Catalyst concentration with reference to resin matrix In contrast the oxazolidinone content in the OX/ICR molded materials of this invention are substantially increased by the cross-linking of EP/IC resins with a formula mole ratio EP:IC in the range of about 1 to 5. Also the mole ratio OX:ICR is not only increased but in favor of oxazolidinone formation, but in addition, may be controlled in a targeted manner by manipulating various reaction parameters which cooperate with each other. These parameters are the formula mole ratio of EP:IC which is in the range between 1 and 5, the cross-linking temperature and the type and concentration of the reaction accelerator, i.e., the hardening catalyst. The values in Table 4 below show the influence on the mole ratio OX:ICR for combinations of the mentioned parameters.

samples presented in Table 5 shows that the OX/ICR molded materials made from EP/IC resins in accordance with this invention have distinctly improved mechanical property values when processes analogous to injection molding involving quick gelling of the resins are employed. The mold occupancy times at gelling temperatures of 130° to 150° C. are between 5 and 15 minutes. Although the values for the dimensional heat stability ($T_M$) are slightly lower when the low pressure fast-casting technique (NSG) is employed; the OX/ICR molded materials with glass transition temperatures above 180° C. have excellent dimensional heat stability.

TABLE 5

Influence of the Standard-Rod Fabrication Conditions or the Molded Material Properties of Cross-linked EP/IC Resins (Formula mole ratio EP/IC ≧ 1)[1]

| EP/IC Resin Sample Designation[1] | Mole Ratio EP:IC | Standard Rod Fabrication Conditions[2] | Molded Material Properties | | |
|---|---|---|---|---|---|
| | | | BF N/mm² | SZ Nmm/mm² | $T_M$ °C. |
| A | 1.0 | KGT: 1 h 100° C., 3 h 130° C., 16 h 200° C. | 105 | 9.5 | 205 |
| A | 1.0 | NSG (3 bar): 10 min 145° C., 16 h 200° C. | 122 | 11.5 | 197 |
| B | 2.0 | KGT: 1 h 100° C., 3 h 130° C., 16 h 200° C. | 116 | 10.5 | 180 |
| B | 2.0 | NSG (3 bar): 10 min 145° C., 16 h 180° C. | 129 | 12 | 171 |
| C | 3.0 | KGT: 1 h 100° C., 3 h 130° C., 16 h 200° C. | 123 | 11.5 | 169 |
| C | 3.0 | NSG (3 bar): 10 min 145° C., 16 h 180° C. | 137 | 13 | 161 |

[1]For chemical designations refer to Tables 10 and 11.
[2]KGT: conventional casting technique, NSG: low pressure fast-casting technique A comparison of the mechanical-thermal property values of the OX/ICR molded materials with acid-

TABLE 4

Formation of OX and ICR Rings in the Cross-linking of EP/IC Resins (Formula mole ratio EP:IC = 1.0 to 3.0)

| Mole Ratio BAGE[1]:MDI[1] | Hardening Catalyst[1] | Mole Ratio OX:ICR | Cross-linking Conditions |
|---|---|---|---|
| 1.0 | 2.0% BCl₃.DMOA | 1.15 | 1 h 100° C., 3 h 130° C., 16 h 200° C. |
| 1.0 | 1.5% BCl₃.DMBA | 1.10 | 1 h 100° C., 3 h 130° C., 16 h 200° C. |
| 1.0 | 1.0% BF₃.1B2PI | 1.46 | 10K/min to 200° C., 16 h 200° C. |
| 1.0 | 1.0% 1CE2PI | 1.90 | 1 h 100° C., 4 h 140° C., 16 h 200° C. |
| 1.0 | 1.0% 1B2PI | 4.10 | 10K/min to 200° C., 16 h 180° C. |
| 2.0 | 2.0% T-Base | 2.50 | 4 h 130° C., 16 h 200° C. |
| 2.0 | 2.0% BF₃.DMBA | 1.20 | 1 h 100° C., 3 h 135° C., 16 h 180° C. |
| 2.0 | 1.0% BCl₃.DMBA | 1.90 | 1 h 100° C., 3 h 130° C., 16 h 200° C. |
| 2.0 | 1.0% 1,2-DMI | 4.40 | 2 h 100° C., 2 h 150° C., 16 h 200° C. |
| 3.0 | 1.5% BCl₃.DMBA | 4.44 | 30 min 135°.C., 16 h 200° C. |

[1]For Chemical Designations See Table 10

It could not be foreseen that the mechanical properties of OX/ICR molded materials prepared in accordance with the present invention would not be degraded in the change from conventional casting and hardening techniques to production of the molded materials by processes analogous to injection molding. Even more surprisingly an improvement in such properties can be achieved. The comparison of the values obtained in the preparation of standard-rod molded anhydride-hardened epoxy resin molded materials, both prepared analogously to injection molding, in Table 6, shows the technical advantage of the OX/ICR molded materials quite distinctly. The results also show, however, that with a formula mole ratio EP:IC greater than about 5, no additional improvement in mechanical-thermal properties over the acid-anhydride-hardened epoxy resin molded materials can be expected.

TABLE 6

Comparison of Mechanical-Thermal Property Values of
Acid-Anhydride-Hardened Epoxy Resin Molded
Materials with OX/ICR Molded Materials on Standard Test Bodies

| EP/SA-Resins[1] Respectively EP/IC Resins[1] | Hardening Conditions | | Molded Material Properties[2] | | |
|---|---|---|---|---|---|
| | Casting Mold | Recirculating-Air Oven | BF N/mm$^2$ | SZ Nmm/mm$^2$ | T$_M$ °C. |
| EP/SA-Resin I   | 10 min 150° C./3 bar | 16 h 160° C. | 116 | 11   | 117 |
| EP/SA-Resin II  | 15 min 150° C./3 bar | 16 h 160° C. | 112 | 10.5 | 110 |
| EP/SA-Resin III | 10 min 150° C./3 bar | 16 h 180° C. | 125 | 10   | 130 |
| EP/IC-Resin A   | 10 min 145° C./3 bar | 16 h 200° C. | 122 | 11.5 | 197 |
| EP/IC-Resin B   | 10 min 145° C./3 bar | 16 h 180° C. | 129 | 12   | 171 |
| EP/IC-Resin C   | 10 min 145° C./3 bar | 16 h 180° C. | 137 | 13   | 161 |
| EP/IC-Resin D   |  7 min 145° C./3 bar | 16 h 180° C. | 127 | 12   | 170 |
| EP/IC-Resin E   |  7 min 145° C./3 bar | 16 h 200° C. | 116 | 11   | 214 |
| EP/IC-Resin F   | 10 min 130° C./3 bar | 16 h 200° C. | 123 | 12   | 167 |
| EP/IC-Resin G   | 10 min 130° C./3 bar | 16 h 200° C. | 118 | 11   | 190 |
| EP/IC-Resin H   | 15 min 140° C./3 bar | 16 h 180° C. | 140 | 20   | 155 |
| EP/IC-Resin I   | 15 min 150° C./3 bar | 16 h 180° C. | 130 | 15   | 160 |

[1]For chemical designations and compositions see Tables 10, 11 and 12
[2]BF = bending strength, SZ = impact strength, T$_M$ = dimensional heat resistance according to Martens U.S. Pat. No. 4,220,731, teaches a method for the manufacture of cross-linked polymers, through reaction of liquid epoxy compounds, containing at least two epoxy groups in the molecule, and polyisocyanates, and optionally, polyhydroxyl compounds in the presence of hardening catalysts at temperatures between room temperature and 250° C. In this method (the reaction of an epoxy compound with a polyisocyanate), the mass ratio can be chosen so that 0.1 to 2.0 (more preferably about 0.3 to 1.2) isocyanate groups, fall on one epoxy group in the starting reaction mixture. However, in this process acid catalysts are used exclusively; i.e. complex compounds of BF$_3$ with an ether, a phosphonium compound, or water, are described as the necessary hardening catalyst, which optionally further include an Sn, Zn or Fe compound soluble in the reaction mixture.

In contrast thereto, exclusively basic catalysts are used in the method according to this invention. Furthermore, U.S. Pat. No. 4,220,731 fails to teach the combination, of the EP:IC ratio (in the reaction resin), the application of pressure and the cross-linking temperatures, and particularly the OX:ICR ratio, which are important in the molded materials produced in accordance with the present invention.

The comments above also apply to U.S. Pat. No. 4,056,579 which teaches a heat-hardening resin composition which comprises the following components:

(a) a condensation product containing isocyanate end-groups which is obtained by reaction of a polycarboxylic acid compound with at least one acid anhydride ring, and a stoichiometric excess of a polyfunctional isocyanate compound, or the condensation product which contains unreacted iscoyanate compound (b) a polyfunctional epoxy compound (c) a catalyst which leads mainly to the formation of isocyanurate and oxazolidinone rings and optionally (d) additives such as pigments, fillers, etc.

The condensation product containing isocyanate and groups, or unreacted isocyanate compound, can be present in a ratio of the isocyanate groups to the polyfunctional epoxy compound of 0.2:1 to 4:1.

The isocyanate compounds present in the resin compositions known from U.S. Pat. No. 4,056,579 are expensive and difficult to produce and they are not satisfactory for use on an industrial scale due to their high viscosity. These known resin compositions therefore are eliminated as practical casting and impregnating resins materials. A further disadvantage of these resins is their relatively high gelling temperature. In contrast thereto, the reaction resin mixtures used in the method according to the invention have a low viscosity and are therefore eminently more suitable casting and impregnating resins, without the use of solvents.

British Pat. No. 1,321,914 and U.S. Pat. No. 3,767,624, describe an oxazolidinone-modified epoxy novalak resin which is obtained by reaction of (a) an epoxy novolak resin and (b) an organic diisocyanate or diisothiocyanate, optionally in the presence of a monovalent alcohol, or a carbamate of an organic diisocyanate and a monovalent alcohol in the presence of catalysts, where the ratio of NCO or NCS groups to epoxy groups is kept in the range of 0.1:1 to 0.5:1. However, these references do not concern the manufacture of molded materials, and are directed to the manufacture of resins, i.e., soluble compounds. These resins are modified epoxy compounds which are then hardened in a manner known per se, i.e., pure epoxy resin hardening takes place, but no reaction with isocyanate.

The determination of the electrical properties of the OX/ICR molded materials produced by the method according to the invention shows that these molded materials also have very good electrical properties. Moreover, tests of the arcing behavior of quartz-powder-filled OX/ICR molded materials according to VDE 0304, Part 3, furnish the category IIa, i.e., re-extinguishing, as shown in Table 7, below. Such a category is possible in quartz-powder-filled acid-anhydride-hardened epoxy resin molded materials only with the additional use of aluminum oxide trihydrate as filler, however, this causes the mechanical properties of the material to drop off. The values for water absorption found in quartz-powder-filled OX/ICR molded materials show that the molded materials made from the quick-hardening EP/IC resins with a formula mole ratio EP:IC equal to or larger than 1 are superior to such molded materials which are made with a formula mole ratio EP:IC smaller than 1. This results, for instance, in a better weather aging behavior. See data in Table 8, below.

TABLE 7

Arcing Behavior of Quartz Powder-Filled OX/ICR Molded Materials according to VDE 0304, Part 3

| Mole Ratio EP:IC | Arcing Behavior Step | |
|---|---|---|
| 2:1 (B) | IIa | Re-extinguishing Flame |
| 1:1 (A) | IIa | Spreading |
| | | $0 < \bar{s} \leq 10$ (mm) |

EP/IC Resins A and B[1]

Cross-linking Conditions: 10 min 145° C., 16 h 200° C. (A)
10 min 145° C., 16 h 180° C. (B)

[1]For chemical designations and compositions see Tables 10 and 11.

TABLE 8

Water Absorption of Quartz Powder-Filled OX/ICR Molded Materials

| Mole Ratio EP:IC | Water Absorption* % |
|---|---|
| 2:1 (B) | 0.22 |
| 1:1 (A) | 0.37 |
| 1:2[2] | 0.58 |

EP/IC Resins A and B[1]

Cross-linking conditions: 10 min 145° C., 16 h 200° C. (A)
10 min 145° C., 16 h 180° C. (B)

*Saturation value at 23° C.
[1]For chemical designations and compositions see Tables 10 and 11
[2]Cross-linking conditions: 3 h 130° C., 16 h 200° C.

It is of special importance for the industrial application of the quick-hardening EP/IC resins that the results obtained with the standard rod molded material samples can be obtained with the manufacturing methods customary in electrical industry. A comparison of the breakdown values (Table 9) for 6-kV support insulators consisting of OX/ICR molded material and of acid-anhydride hardened EP/SA resin molded material, respectively, shows that the OX/ICR support insulators have considerably improved breakdown values which are only slightly lower than the starting values at 100° C. even after a four-week anneal at 160° C. and at test temperatures of up to 155° C.

TABLE 9

Comparison of the Breakdown Values of 6-kV Support Insulators Made of OX/ICR Molded Materials Versus Acid-Anhydride Hardened Epoxy Resin Molded Materials

| Pre-treatment | Test Temperature in °C. | Breakdown Values in kN | |
|---|---|---|---|
| | | OX/ICR Molded Material[1] | EP/SA-Resin Molded Material[2] |
| without annealing | 100 | 17 ± 4 | 8 ± 3 |
| | 155 | 11 ± 2 | 2 ± 0.5 |
| 24 hours at 160° C. | 100 | 16 ± 2 | 7 ± 2 |
| | 155 | 11 ± 2 | 3 ± 1 |
| 24 hours at 200° C. | 100 | 18 ± 1 | 8 ± 2 |
| | 155 | 12 ± 2 | — |
| 4 weeks at 160° C. | 100 | 12 ± 2 | — |
| | 155 | 15 ± 2 | — |

[1]EP/IC-Resin A (see Tables 6 and 11)
[2]EP/SA Resin II (see Tables 6 and 12)

In the method according to the invention, a pressure between 1 to 10 bar is generally applied during the gelling step.

The polyepoxides used in the method according to the invention are relatively low-viscosity aliphatic, cycloaliphatic or aromatic epoxies, as well as, mixtures thereof. Preferable polyepoxides are bisphenol-A-diglycidyl ether; bisphenol-F-diglycidyl ether; 3,4-epoxycyclohexylmethyl-3'4'-epoxy cyclohexane carboxylate; polyglycidyl ethers of phenol/formaldehyde or cresol/formaldehyde-novolak; diglycidyl esters of phthalic, isophthalic or terephthalic acid; as well as, mixtures of these epoxy resins. Other usable polyepoxides are, for instance, hydrogenated bisphenol-A or bisphenol-F diglycidyl ethers; hydantoin epoxy resins; triglycidylisocyanurate; triglycidyl-p-amino phenol; tetraglycidyl diaminodiphenyl methane; tetraglycidyl diaminodiphenyl ether; tetrakis(4-glycidoxy-phenyl)-ethane; urazolepoxides and epoxides which are described in "Handbook of Epoxy Resins" by Henry Lee and Kris Neville, McGraw-Hill Book Company, 1967, and in the monograph by Henry Lee "Epoxy Resins", American Chemical Society, 1970.

Polyisocyanates that are useful in practicing the method according to the invention are relatively low-viscosity aliphatic, cycloaliphatic or aromatic isocyanates and mixtures thereof. Preferably, isomer mixtures of 4,4'- and 2,4'-diphenylmethane-diisocyanate; polyol-modified polyisocyanates and mixtures of liquid polyisocyanates with high-molecular weight polyisocyanates or carbodiimide polyisocyanates are used. Other usable polyisocyanates are, for instance, hexane-1,6-diisocyanate; cyclohexane-1,3-diisocyanate and its isomers; 4,4'-dicyclohexylmethane diisocyanate; 3-isocyanatomethyl-3,5,5-trimethyl cyclohexylisocyanate; 1,3-dimethylbenzene-ω,ω'-diisocyanate and its isomers; 1-methylbenzene-2,4-diisocyanate and its isomers; naphthalene-1,4-diisocyanate; diphenyl ether-4,4'-diisocyanate and its isomers; diphenylsulfone-4,4'-diisocyanate and its isomers; as well as, tri- or higher functional isocyanates such as 3,3',4,4'-diphenylmethane tetraisocyanate. Furthermore, the isocyanates may be masked with phenol or cresol in the usual manner for use in the method of this invention. Dimers and trimers of the mentioned multivalent iscoyanates can also be used. Such polyisocyanates have end-position (terminal) free isocyanate groups and may contain one or more uretdione and/or isocyanurate rings. Methods for producing different types of such trimers and uretdiones are described in the literature, for instance, in U.S. Pat. Nos. 3,494,888; 3,108,100 and 2,977,370 which are incorporated herein by reference.

The EP/IC resins may also contain components which generally do not participate in the chemical reactions which lead to the OX/ICR molded materials. Such as fillers, for example, mineral and fibrous fillers such as quartz powder, fused silica, aluminum oxide, glass power, mica, kaolin, dolomite, graphite and carbon black, as well as, carbon fibers, glass fibers and textile fibers are used.

Pigments, stabilizers and adhesion agents as well as other conventional additives may also be added to these EP/IC resins.

In the method according to the invention, tertiary amines and imidazoles are used as hardening catalysts which promote the formation of OX and ICR rings in the cross-linking reaction. Examples of the tertiary amines are tetramethylethylene diamine; dimethyloctylamine; dimethylaminoethanol; dimethylbenzylamine; 2,4,6-tris(dimethyl-aminomethyl)-phenol; N,N'-tetramethyldiaminodiphenyl methane; N,N'-dimethylpiperazine, N-methylmorpholine; N-methylpiperidine; N-ethylpyrrolidine; 1,4-diazabicyclo-(2,2,2)-octane and quinolines. Examples of the imidazoles are 1-methylimidazole; 2-methylimidazole; 1,2-dimethylimidazole; 1,2,4,5-tetramethylimidazole; 1-benzyl-2-phenylimidazole; 2-undecylimidazole; 2-heptadecylimidazole; 2-ethyl-4-methylimidazole; 1-cyanoethyl-2-ethyl-4-methylimidazole; 1-cyanoethyl-2-phenylimidazole and 1-(4,6-diamino-s-triazinyl-2-ethyl)-2-phenylimidazole. Additional hardening catalysts for the EP/IC resins include onium salts of tertiary amines and imidazoles, i.e., onium salts with nitrogen as the central atom. Examples of such onium salts are: tetraethylammonium chloride; tetraethylammonium bromide; octyltrimethylammonium bromide; benzyltrimethylammonium chloride; N-ethylmorpholinium bromide; 2-ethyl-4-methylimidazolium bromide; N-ethylmorpholinium-tetraphenyl borate; 1,2-dimethylimidazolium tetraphenyl borate and tetrabutylammonium tetraphenyl borate.

However, the mentioned hardening catalysts are active at low temperatures and thus lead to relatively short pot times, which can make the processing of the EP/IC resins more difficult. In the method according to the invention, latent hardening catalysts are therefore preferred to ensure sufficient use (pot) time at low temperatures. Such catalysts, which are sometimes called latent reaction and accelerators and which are particularly well suited to the present invention are addition complexes of boron trihalogenides with tertiary amines and imidazoles, for example, the addition complexes, described in U.S. Pat. No. 4,131,600, of boron trichloride and tertiary amines of the general formula $BCl_3NR^1R^2R^3$, where $R^1$, $R^2$, and $R^3$ are the same or different aliphatic, aromatic, heterocyclic or arylaliphatic radicals which may also be part of heterocyclic rings in pairs. The analogous complexes of boron trifluoride of the formula $BF_3NR^1R^2R^3$, where $R^1$, $R^2$ and $R^3$, have the meaning given above, are also useful. Specific examples of suitable tertiary amines of the $BF_3$ and $BCl_3$ complexes are octyldimethylamine and benzyldimethylamine. Additional examples are morpholine compounds and imidazoles, especially methylmorpholine; N-ethylmorpholine; 1,2-dimethylimidazole and 1-benzyl-2-phenylimidazole which are suitable for forming $BCl_3$ and $BF_3$ complexes.

Extension of the use time of the resins used in the method according to the invention can be obtained also if tertiary amines or imidazoles which are deactivated by the addition of electron acceptors are used as latent hardening catalysts. The electron acceptors may be, for example, 7,7,8,8-tetracyanoquinodimethane; 2,3-dichloro-5,6-dicyanobenzoquinone; 2,3,5,6-tetrachlorobenzoquinone; 1,2-dinitrobenzene; and isomers thereof.

The hardening-catalyst content in the EP/IC resins is advantageously about 0.01 to 5% by weight and preferably 0.25 to 2.5% by weight, with respect to the mass of the resin matrix. The type and concentration of the hardening catalyst, influences the hardening temperature and the hardening time of the EP/IC resins.

The invention will be explained in further detail with the aid of the following examples. The composition of the EP/IC resins used in the following examples can be taken from Tables 10 and 11.

TABLE 10

| EP/IC-Resin Components, Hardening catalysts Fillers | | | |
|---|---|---|---|
| POLYEPOXIDES | Abbreviated Designation | Epoxy Value mole/100 g | Viscosity mPa · sec |
| Hexahydrophtalic acid diglycidyl ester | HHGE | 0.64–0.68 | 300–600 (25° C.) |
| Bisphenol-A-diglycidyl ether | BAGE | 0.56–0.58 | 4000–6000 (25° C.) |
| Isomeric Bisphenol-F-diglycidyl ether | BFGE | 0.60–0.62 | 5000–7000 (25° C.) |
| Novolak-Epoxy resin | NOEP | 0.56–0.58 | 1100–1700 (52° C.) |
| Polyoxypropylenglycoldiglycidyl ether | PPGE | 0.30–0.32 | 30–60 (25° C.) |
| Hydantoin-Epoxy resin | HYEP | 0.68–0.72 | 1400–1500 (25° C.) |
| POLYISOCYANATES | Abbreviated Designation | Isocyanate Value mole/100 g | Viscosity mPa sec |
| Isomeric Diphenylmethanediisocyanate | MDI | 0.78–0.80 | 15 (25° C.) |
| Carbodiimide-Polyisocyanate | CDIC | 0.67–0.69 | 40 (25° C.) |
| Polyol-modified Diisocyanate | POIC | 0.59–0.61 | 140 (25° C.) |
|  | Abbreviated Designation | Note | |
| Dicarboxylic Acid Anhydride | | | |
| Hexahydrophthalic acid anhydride | HHPSA | — | |
| Methyltetrahydrophthalic acid anhydride | MTHPSA | — | |
| Methylhexahydrophthalic acid anhydride | MHPSA | — | |
| Hardening Catalyst | | | |
| Boron trichloride.Dimethylbenzylamine-adduct | $BCl_3$.DMBA | — | |
| Boron trichloride.Dimethyloctylamine-adduct | $BCl_3$.DMOA | — | |
| Boron trifluoride.Dimethylbenzylamine-adduct | $BF_3$.DMBA | — | |
| Boron trifluoride.1-Benzyl-2-phenylimidazole-adduct | $BF_3$.1B2PI | — | |
| Dimethylbenzylamine | DMBA | — | |
| Isomeric Bis-(Dimethylamino)-diphenylmethane | T-Base | — | |
| 1,2-Dimethylimidazole | 1,2-DMI | purified | |
| 1-Cyanoethyl-2-phenylimidazole | 1CE2PI | " | |
| 1-Benzyl-2-phenylimidazole | 1B2PI | " | |
| 1-Methylimidazole | 1MI | " | |
| Filler | | | |
| Quartz Powder | QM I | 6400 M/cm$^2$ | |
| Quartz Powder | QM II | 16900 M/cm$^2$ | |

TABLE 11

| EP/IC Resin | Polyepoxide | Polyisocyanate | EP:IC mole/mole | Hardening catalyst[1] | Filler |
|---|---|---|---|---|---|
| A | BAGE | MDI | 1.0 | 2,0% BCl$_3$.DMBA | 66% QM I |
| B | BAGE | MDI | 2.0 | 2,0% BCl$_3$.DMBA | 66% QM I |
| C | BAGE | MDI | 3.0 | 2,0% BCl$_3$.DMBA | 66% QM I |
| D | HHGE | MDI | 1.0 | 2,0% BCl$_3$.DMBA | 66% QM I |
| E | NOEP | MDI | 2.0 | 2,0% BCl$_3$.DMBA | 66% QM I |
| F | BFGE | POIC,MDI[2] | 1.0 | 1,5% BCl$_3$.DMBA | 66% QM II |
| G | BFGE | CDIC | 1.0 | 1,5% BCl$_3$.DMBA | 66% QM II |
| H | BAGE | POIC,MDI[3] | 1.0 | 1,0% 1CE2PI | 66% QM II |
| I | BAGE | MDI | 2.0 | 1,5% BF$_3$.1B2PI | 66% QM I |

[1] Catalyst concentration with reference to resin matrix
[2] Mole ratio isocyanate groups POIC:MDI = 2:1
[3] Mole ratio isocyanate groups POIC:MDI = 3:1

EXAMPLES 1 TO 5

The EP/IC resins A, B, C, D and E were prepared as follows: the individual components (BAGE or HHGE or NOEP, MDI and QM I, etc., defined in Table 10) were successively stirred into a mixing vessel preheated to 80° C. and degassed for 1 hour at 80° C. while stirring and at reduced pressure (less than 1 mbar). Subsequently, the EP/IC resins were cooled down to 60° C., the hardening catalyst was added and the EP/IC resins were again degassed for 1 hour at 60° C. while stirring and at reduced pressure. (In the case of the resins D and E, the degassing time was only 30 minutes). Thereupon the EP/IC resins were poured under pressure (3 bar) into standard rod molds preheated to 145° C.; the mold occupation time was 10 minutes for the resins A, B and C and 7 minutes for the resins D and E. The standard rods removed from the mold were then hardened for 16 hours at 200° C. (resins A and E) and 16 hours at 180° C. (resins B, C and D), respectively. On the so prepared OX/ICR molded materials, the bending strength (BF) was measured according to DIN No. 53 452, the impact strength (SZ) according to DIN No. 53 453 and the dimensional heat resistance according to Martens (T$_M$) in accordance with DIN No. 53,458. The values determined by these tests for the physical properties of the molded materials are summarized in Table 6 above.

EXAMPLES 6 TO 8

(Reference Tests)

The EP/IC resins A, B and C were used; the resins were processed as in Examples 1 to 5. The EP/IC resins were poured with conventional casting techniques (KGT) into standard rod molds pre-heated to 100° C. The cross-linking (hardening) of the resins took place for 1 hour at 100° C. and thereafter for 3 hours at 130° C. Subsequently, the standard rods were taken from the mold and hardened for 16 hours at 200° C. The values determined for the physical properties of these molded materials are summarized in Table 5 above, along with the corresponding values for the low-pressure quick-casting technique (NSG).

EXAMPLES 9 TO 11

(Reference Tests)

The EP/SA resins I, II, and III were used, i.e., resins based on polyepoxide/dicarboxylic acid anhydride (see Table 12). The filler (QM I) contained in the EP/SA resins was pre-dried for 16 hours at 120° C.; then the resin components were stirred into a mixing vessel preheated to 70° C.; homogenized and the hardening catalyst was added. Then, the EP/SA resins were degassed for 15 to 20 minutes at 70° C. while stirring and at reduced pressure (less than 5 mbar) and poured under pressure (3 bar) into molds preheated to 150° C.; the mold occupancy time was 10 minutes for the EP/SA resins I and III, and 15 minutes for the EP/SA resin II. The standard rods were released from the mold and hardened for 16 hours at 160° C. (resins I and II) and 16 hours at 180° C. (resin III), respectively. The values determined for the physical properties of these molded materials are summarized in Table 6 above.

TABLE 12

| EP/SA Resin | Polyepoxide | Dicarboxylic acid Anhydride | EP:SA mole/mole | Hardening Catalyst[1] | Filler |
|---|---|---|---|---|---|
| I | BAGE | HHPSA | 1:0.9 | 1.0% DMBA | 66% QM I |
| II | HHGE | MHPSA | 1:1 | 2.0% BCl$_3$.DMBA | 66% QM I |
| III | NOEP | MTHPSA | 1:0.9 | 2.0% BCl$_3$.DMBA | 66% QM I |

[1] Catalyst concentration with reference to polyepoxide mass.

EXAMPLES 12 AND 13

The EP/IC resins F and G were used. These resins were processed as in Examples 1 to 5. Thereupon, the EP/IC resins ready to be cast were cooled down to 30° C. and poured under pressure (3 bar) into standard rod molds pre-heated to 130° C.; the mold occupancy time was 10 minutes at 130° C. The standard rods taken from the mold were then hardened for 16 hours at 200° C. The values obtained for the physical properties of these molded materials are summarized in Table 6 above.

EXAMPLES 14 AND 15

The EP/IC resins H and I were used. The resins were dried and degassed as in Examples 1 to 5. The EP/IC resins were cooled down to 40° C. before adding the hardening catalyst; the resins were then degassed once more for 20 minutes at 40° C. while being stirred and at reduced pressure (less than 1 mbar). Then, the EP/IC resins were poured under pressure (3 bar) into molds pre-heated to 140° C. (resin H) and 150° C. (resin I), respectively; the mold occupancy time was 15 minutes.

The standard rods taken from the mold were then hardened for 16 hours at 180° C. The values determined for the physical properties of these molded materials are summarized in Table 6 above.

EXAMPLE 16

The EP/IC resin D was used for fabricating 6-kV support insulators. The resin was processed as in Examples 1 to 5. The subsequent processing of the casting resin mass for the fabrication of the 6-kV support insulators was accomplished by using an electrically heated steel casting mold (Casting mold temperature: 150° C.: processing pressure: 3 bar; mold closing time: 10 minutes). After removal from the mold, the 6-kV support insulators were hardened for 16 hours at 180° C. The breakdown values for the support insulators at test temperatures of 100° and 155° C. in the original state and after thermal stress at 160° and 200° C. are given in Table 9 above.

EXAMPLE 17

(Reference Test)

The EP/SA resin II was used to make 6-kV support insulators. The resin was prepared in accordance with Examples 9 to 11. The support insulators were fabricated as in Example 16; however, the mold closing time was extended to 15 minutes and the post-hardening temperature was lowered to 160° C. The determined breakdown values are given in Table 9 above.

What is claimed is:

1. A method for the preparation of molded material for insulating components, which comprises:
   mixing a polyepoxide, and a polyisocyanate to form a reaction resin mixture having a viscosity of up to about 7000 mPa.sec at 25° C. wherein the mole ration of epoxy to isocyanate groups is in the range of more than 1:1 to 5:1;
   reacting the reaction resin mixture with a hardening catalyst selected from the group consisting of a tertiary amine and an imidazole under conditions of an elevated pressure of 1 to 10 bar, a gelling temperature of about 130° to 150° C., and a mold occupation time of between 5 and 15 minutes to form a cross-linked polymer; heating the cross-linked polymer at a temperature from about 150° to about 200° C. to cause post-hardening and produce a molded material;
   said molded material having a mole ratio of oxazolidinone and isocyanurate rings greater than about 1; and the reaction of the epoxy and isocyanate groups therein being greater than 90% after hardening.

2. The method according to claim 1, wherein: the hardening catalyst comprises a latent hardening catalyst.

3. The method according to claim 2, wherein:
   the latent hardening catalyst comprises the adduct of a boron trihalogenide and at least one compound selected from the group consisting of a tertiary amine and an imidazole.

4. The method according to claim 2, wherein:
   the latent hardening catalyst comprises an electron acceptor deactivator and at least one compound selected from the group consisting of an imidazole and a tertiary amine.

5. The method according to claim 4, wherein:
   the latent hardening catalyst comprises a 7,7,8,8-tetracyanoquinodimethane deactivator and at least one compound selected from the group consisting of an imidazole and a tertiary amine.

6. The method according to claim 2 wherein: the latent hardening catalyst is selected from the group consisting of onium salts of tertiary amines and imidazoles.

7. The method according to claim 6, wherein:
   the latent hardening catalyst is selected from the group consisting of 1,2-dimethylimidazolium tetraphenyl borate and benzyltrimethyl-ammonium chloride.

8. The method according to claim 1 wherein:
   the hardening catalyst content in the reaction resin mixture is about 0.01-5.0% wt.

9. The method according to claim 8 wherein:
   the hardening catalyst content in the reaction resin mixture is about 0.25-2.5% wt.

10. The method according to claim 1, wherein:
    the reaction resin mixture includes a filler.

11. The method according to claim 2 wherein:
    the reaction resing mixture includes a filler.

12. The method according to claim 10, wherein:
    the filler is selected from the group consisting of quartz powder, fused silica, aluminum oxide, and dolomite.

13. The method according to claim 11, wherein:
    the filler is selected from the group consisting of quartz powder, fused silica, aluminum oxide, and dolomite.

* * * * *